United States Patent
Kuwahara et al.

(10) Patent No.: US 8,935,063 B2
(45) Date of Patent: Jan. 13, 2015

(54) CONTROL APPARATUS AND CONTROL METHOD FOR VEHICLE

(75) Inventors: Seiji Kuwahara, Toyota (JP); Toshiya Oishi, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 663 days.

(21) Appl. No.: 13/147,078

(22) PCT Filed: Jan. 29, 2009

(86) PCT No.: PCT/JP2009/051449
§ 371 (c)(1),
(2), (4) Date: Jul. 29, 2011

(87) PCT Pub. No.: WO2010/086981
PCT Pub. Date: Aug. 5, 2010

(65) Prior Publication Data
US 2011/0288732 A1    Nov. 24, 2011

(51) Int. Cl.
*B60W 10/10*    (2012.01)
*B60W 50/06*    (2006.01)
*B60W 10/06*    (2006.01)
(Continued)

(52) U.S. Cl.
CPC .............. *B60W 50/06* (2013.01); *B60W 10/06* (2013.01); *B60W 10/10* (2013.01); *B60W 30/188* (2013.01); *F02D 11/105* (2013.01); *B60W 2710/065* (2013.01); *B60W 2710/105* (2013.01); *F02D 2250/21* (2013.01)
USPC .............................................. 701/54; 701/51

(58) Field of Classification Search
CPC ..... B60W 10/00; B60W 10/06; B60W 10/10; B60W 30/188; B60W 50/06; B60W 2710/065; B60W 2710/105; F02D 11/105; F02D 2250/21
USPC .................................................. 701/51, 53, 54
See application file for complete search history.

(56) References Cited

U.S. PATENT DOCUMENTS

| | | | |
|---|---|---|---|
| 6,728,622 B2 * | 4/2004 | Mayer | 701/93 |
| 7,761,211 B2 * | 7/2010 | Hofmann | 701/51 |
| 2003/0120412 A1 * | 6/2003 | Mayer | 701/70 |

(Continued)

FOREIGN PATENT DOCUMENTS

| | | | |
|---|---|---|---|
| DE | 19946041 A1 | | 3/2001 |
| DE | 199946041 | * | 3/2001 |

(Continued)

OTHER PUBLICATIONS

Mayer, R., Espacenet English-language abstract for French document FR2832360 A1, corresponding to DE10156948 A1, published Jun. 26, 2003.

(Continued)

*Primary Examiner* — Thomas G Black
*Assistant Examiner* — Ce Li
(74) *Attorney, Agent, or Firm* — Kenyon & Kenyon LLP

(57) ABSTRACT

A dynamic threshold value when an engine, an automatic transmission and the like are in a transition state is calculated in accordance with a static threshold value determined based on a state where the engine, the automatic transmission and the like are stabilized. The engine and the automatic transmission are controlled in accordance with a result of comparison between target drive force or target engine torque and the dynamic threshold value.

10 Claims, 18 Drawing Sheets

(51) Int. Cl.
*B60W 30/188* (2012.01)
*F02D 11/10* (2006.01)

(56) References Cited

U.S. PATENT DOCUMENTS

| | | | |
|---|---|---|---|
| 2008/0015755 A1* | 1/2008 | Kuwahara et al. | 701/48 |
| 2008/0059032 A1* | 3/2008 | Hofmann | 701/55 |
| 2008/0200303 A1* | 8/2008 | Tabata et al. | 477/107 |
| 2009/0037061 A1* | 2/2009 | Tabata et al. | 701/55 |
| 2009/0043466 A1* | 2/2009 | Nakai et al. | 701/55 |

FOREIGN PATENT DOCUMENTS

| | | | |
|---|---|---|---|
| DE | 10156948 A1 | | 6/2003 |
| DE | 10249689 A1 | * | 5/2004 |
| DE | 102006041155 A1 | | 3/2008 |
| DE | 102006046218 A1 | * | 4/2008 |
| JP | 2006-290235 A | | 10/2006 |
| JP | 2007-211867 A | | 8/2007 |

OTHER PUBLICATIONS

Fuchs, E., Espacenet English-language abstract for DE10249689 A1, published May 13, 2004.
Puchas, C., Espacenet English-language abstract for DE19946041 A1, published Mar. 29, 2001.
Hofman, L., Espacenet English-language abstract for DE102006041155 A1, published Mar. 20, 2008.
Lehner, S., Espacenet English-language abstract for DE102006046218 A1, published Apr. 3, 2008.
English translation of Office Action dated Jul. 29, 2013, received in German Patent and Trademark Office Application No. 11 2009 004 356.9.
International Search Report mailed Nov. 2, 2009 of PCT/JP2009/051449.

* cited by examiner

F I G. 1
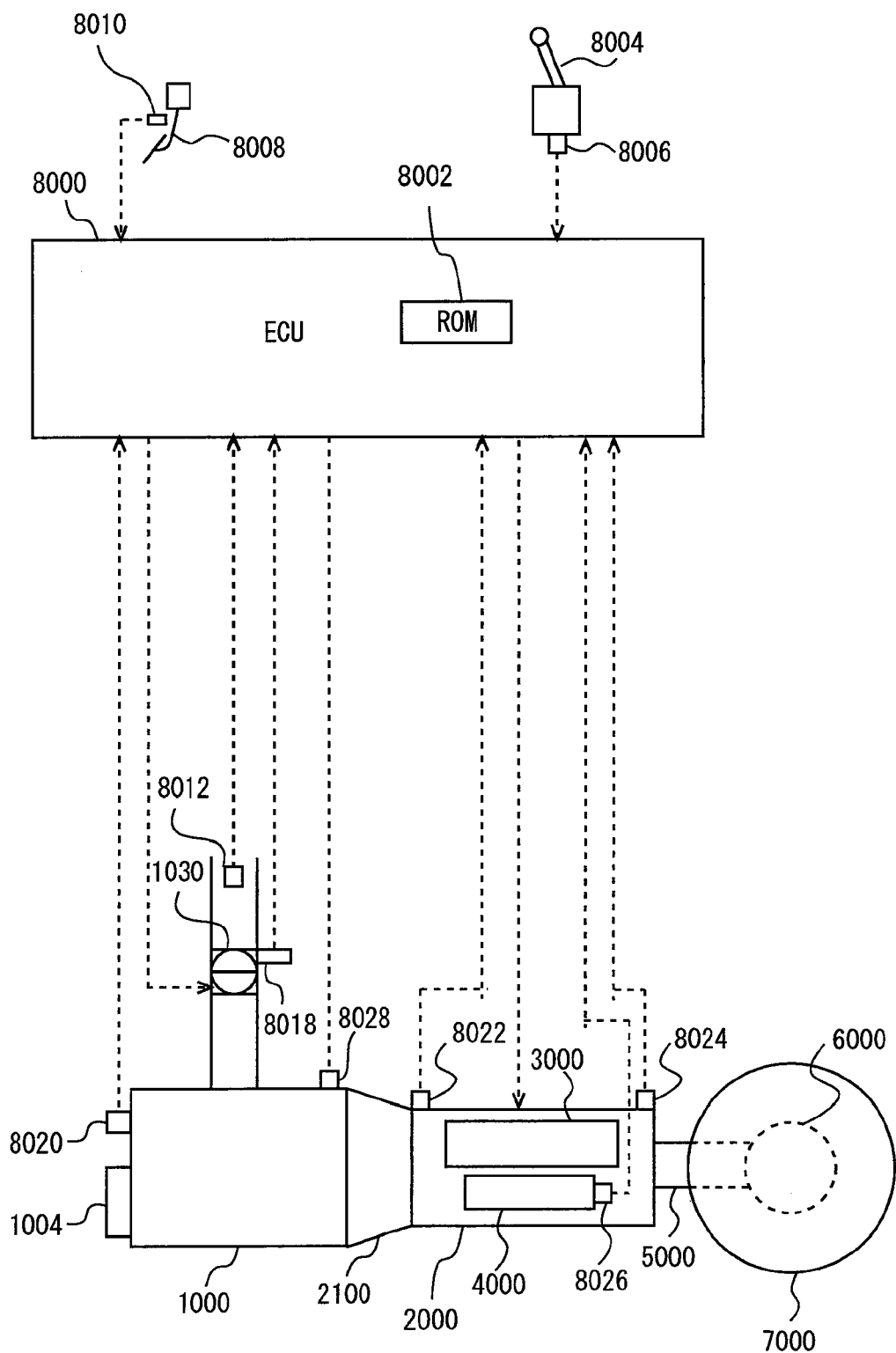

F I G. 2
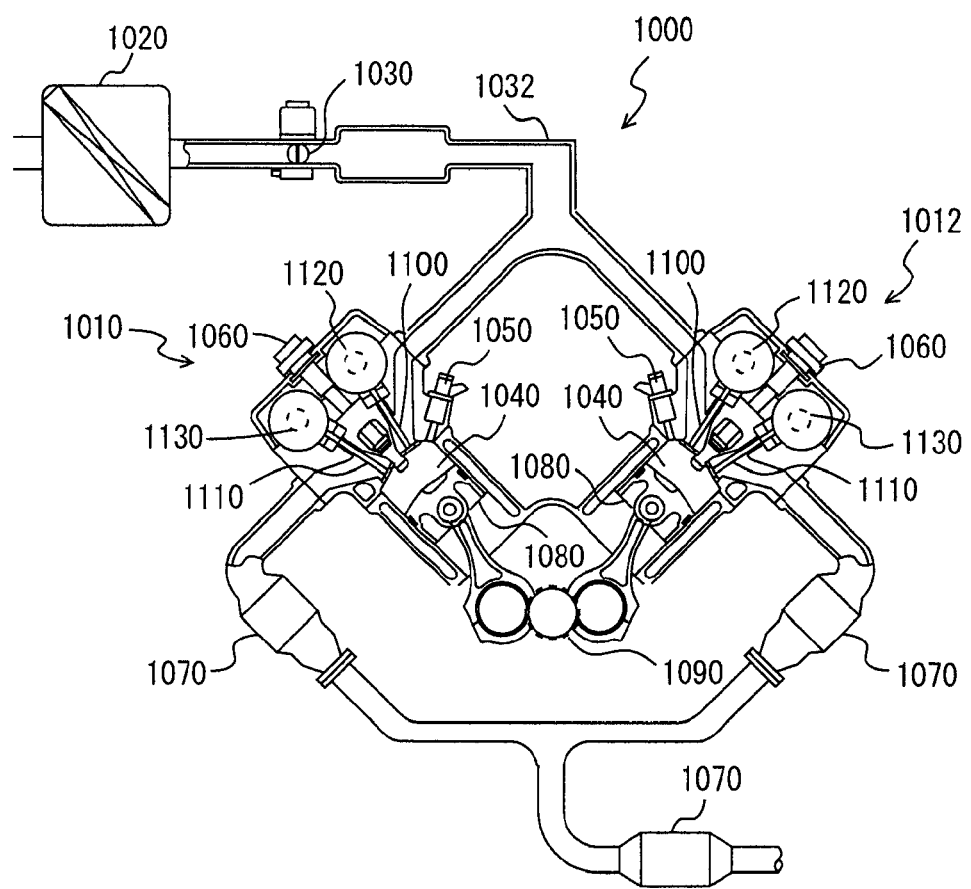

F I G . 5
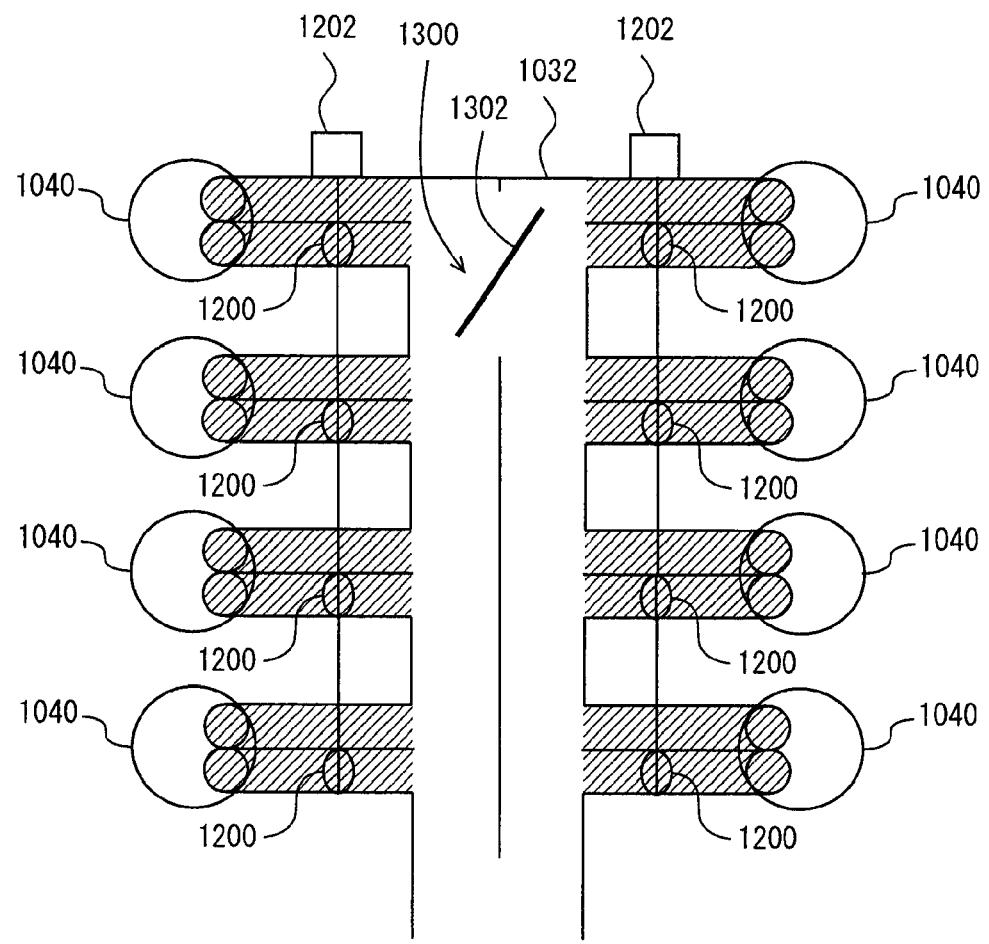

FIG. 7

|  | C1 | C2 | C3 | C4 | B1 | B2 | F |
|---|---|---|---|---|---|---|---|
| P | × | × | × | × | × | × | × |
| R1 | × | × | ○ | × | × | ○ | × |
| R2 | × | × | × | ○ | × | ○ | × |
| N | × | × | × | × | × | × | × |
| 1ST | ○ | × | × | × | × | ◎ | △ |
| 2ND | ○ | × | × | × | ○ | × | × |
| 3RD | ○ | × | ○ | × | × | × | × |
| 4TH | ○ | × | × | ○ | × | × | × |
| 5TH | ○ | ○ | × | × | × | × | × |
| 6TH | × | ○ | × | ○ | × | × | × |
| 7TH | × | ○ | ○ | × | × | × | × |
| 8TH | × | ○ | × | × | ○ | × | × |

○ ENGAGEMENT
× DISENGAGEMENT
◎ ENGAGEMENT AT THE TIME OF ENGINE BRAKING
△ ENGAGEMENT ONLY AT THE TIME OF DRIVING

CONTROL APPARATUS AND CONTROL METHOD FOR VEHICLE

This is a 371 national phase application of PCT/JP2009/051449 filed 29 Jan. 2009, the contents of which are incorporated herein by reference.

TECHNICAL FIELD

The present invention relates to a control apparatus and a control method for a vehicle, particularly to a technique for setting a target value for drive force of the vehicle and controlling the vehicle in accordance with the set target value.

BACKGROUND ART

Conventionally, there is a known engine in which a value of output torque or the like is determined by an opening position of a throttle valve (hereinafter, also referred to as a throttle opening position) or the like. In general, the throttle opening position is actuated so as to uniquely correspond to a position of an accelerator pedal (hereinafter, also referred to as an accelerator pedal position). However, when the throttle opening position and the accelerator pedal position always uniquely correspond to each other, drive force of a vehicle or the like is not easily controlled irrespective of an intention of a driver for example in the case where a behavior of the vehicle is disordered. Therefore, there is a vehicle provided with an electronic throttle valve actuated by an actuator in an engine so as to be capable of controlling the output torque and the like not depending on the accelerator pedal position.

In the vehicle provided with the electronic throttle valve, it is possible to set target drive force of the vehicle as described in Japanese Patent Laying-Open No. 2006-290235 (Patent Literature 1), instead of setting the throttle opening position in accordance with the accelerator pedal position as in the conventional technique, and to control a power source and a transmission such that the set target drive force is realized. By setting the target drive force using parameters such as the yaw rate and the lateral acceleration other than the accelerator pedal position, optimal drive force corresponding to operations by the driver, the behavior of the vehicle and the like can be obtained.

Patent Literature 1: Japanese Patent Laying-Open No. 2006-290235

SUMMARY OF INVENTION

Technical Problem

In the vehicle having the engine, the automatic transmission and the like controlled in accordance with the target drive force, the accelerator pedal position and the target drive force do not uniquely correspond to each other. Thus, even if the accelerator pedal position is low, the engine is not always in an idle state. Therefore, if whether the engine is in the idle state or not is determined based on the accelerator pedal position, for example, as in conventional typical vehicles, a wrong determination may be made as to whether the engine is in the idle state or not. Thus, it is desirable to determine whether the engine is in the idle state or not, based on the target drive force, for example.

In addition, a conventional typical automatic transmission is controlled to shift gears in accordance with a shift map having the accelerator pedal position as a parameter. However, even if the automatic transmission is controlled to shift gears based on the accelerator pedal position in the vehicle having the engine, the automatic transmission and the like controlled in accordance with the target drive force, desired drive force cannot always be obtained. Thus, it is desirable to determine whether or not to shift gears of the automatic transmission, using the target drive force instead of the accelerator pedal position.

The target drive force set for controlling the drive force is, however, determined dynamically in consideration of a transient property (a delay in response) of the engine or the like. In other words, the target drive force is set to indicate dynamic target drive force when the engine and the like are in a transition state (when the drive force of the vehicle is in the transition state), in addition to when the engine and the like are in a stable state (when the drive force of the vehicle is in the stable state).

On the other hand, a threshold value used to determine whether the engine is in the idle state or not and whether or not to shift gears of the automatic transmission is determined statically based on the state where the engine and the like are stabilized. Therefore, if the dynamic target drive force is compared with the static threshold value, it cannot be determined appropriately in some cases whether the engine is in the idle state or not and whether or not to shift gears of the automatic transmission, while the engine and the like are in the transition state.

It is also possible to set a threshold value when the engine and the like are in the transition state. Such a threshold value must be set in consideration of all operation states, which takes enormous time. Therefore, it is extremely difficult realistically to set the threshold value when the engine and the like are in the transition state.

Thus, it can be determined whether the engine is in the idle state or not, whether or not to shift gears of the automatic transmission, and the like only after the engine and the like attain the stable state or a state close to the stable state, and therefore determination about control over a powertrain may delay. Thus, a response of the control may delay.

The present invention has been made to solve the above problems and an object thereof is to improve the response property of the control.

Solution to Problem

A control apparatus for a vehicle according to an aspect is directed to a control apparatus for a vehicle equipped with a driving source and an automatic transmission. The control apparatus includes: a setting unit that sets a dynamic target value for drive force of the vehicle; a calculating unit that calculates a dynamic second threshold value in accordance with a static first threshold value; and a controlling unit that controls the vehicle in accordance with a result of comparison between the target value and the second threshold value.

With such a configuration, the dynamic second threshold value when the driving source, the automatic transmission and the like are in a transition state is calculated in accordance with the static first threshold value determined based on, for example, a state where the driving source, the automatic transmission and the like are stabilized. The vehicle is controlled in accordance with a result of comparison between the dynamic target value for the drive force of the vehicle and the second threshold value. As a result, in the transition state of the driving source, the automatic transmission and the like, it can be determined, for example, whether an engine serving as the driving source is in the idle state or not and whether or not to shift gears of the automatic transmission, without presetting the threshold value when the driving source, the automatic transmission and the like are in the transition state.

Thus, determination about control can be made before the driving source, the automatic transmission and the like are stabilized. Consequently, a response property of the control can be improved.

Preferably, the calculating unit calculates, as the second threshold value, a value that changes with a delay with respect to a stepwise change from the target value to the first threshold value.

With such a configuration, the second threshold value is calculated to change with the delay with respect to the stepwise change from the target value to the first threshold value, whereby the dynamic second threshold value can be obtained.

More preferably, the setting unit sets the target value repeatedly. The calculating unit calculates, as the second threshold value, the value that changes with the delay with respect to the stepwise change from a previous value of the target value to the first threshold value. The controlling unit controls the vehicle in accordance with a result of comparison between a current value of the target value and the second threshold value.

With such a configuration, the second threshold value is calculated to change with the delay with respect to the stepwise change from the previous value of the target value set repeatedly to the first threshold value, whereby the dynamic second threshold value can be obtained. In addition, the current value of the target value is compared with the second threshold value, whereby in the transition state of the driving source, the automatic transmission and the like, determination about control can be made when the current value of the target value is set.

More preferably, the calculating unit calculates, as the second threshold value, a primary delay response to the stepwise change from the previous value of the target value to the first threshold value.

With such a configuration, the primary delay with respect to the stepwise change from the previous value of the target value to the first threshold value is taken into consideration, whereby the dynamic second threshold value can be accurately obtained from the static first threshold value.

More preferably, the controlling unit controls the automatic transmission such that gears are shifted in accordance with whether the target value is larger or smaller than the second threshold value.

With such a configuration, determination as to whether or not to shift gears of the automatic transmission can be made in the transition state of the driving source, the automatic transmission and the like.

More preferably, the driving source is an engine. The control apparatus further includes a determining unit that determines that the engine is in an idle state when the target value is smaller than the second threshold value. The controlling unit controls the vehicle in accordance with whether the engine is in the idle state or not.

With such a configuration, in the vehicle controlled in different manners in accordance with whether the engine is in the idle state or not, determination as to whether the engine is in the idle state or not can be made when the driving source, the automatic transmission and the like are in the transition state.

More preferably, the driving source is an engine capable of changing a length of an intake pipe. The controlling unit controls the engine such that the length of the intake pipe is changed in accordance with whether the target value is larger or smaller than the second threshold value.

With such a configuration, determination as to whether or not to change the length of the intake pipe of the engine can be made when the driving source, the automatic transmission and the like are in the transition state.

More preferably, the target value is a target value of output torque of the driving source.

With such a configuration, determination about control can be made by using the target value of the output torque of the driving source, when the driving source, the automatic transmission and the like are in the transition state.

More preferably, the target value is a target value of input torque of the automatic transmission.

With such a configuration, determination about control can be made by using the target value of the input torque of the automatic transmission, when the driving source, the automatic transmission and the like are in the transition state.

More preferably, the target value is a target value of the drive force of the vehicle.

With such a configuration, determination about control can be made by using the target value of the drive force of the vehicle, when the driving source, the automatic transmission and the like are in the transition state.

More preferably, the target value is a target value of acceleration of the vehicle.

With such a configuration, determination about control can be made by using the target value of the acceleration of the vehicle, when the driving source, the automatic transmission and the like are in the transition state.

Advantageous Effects of Invention

According to the present invention, the response property of the control over the vehicle can be improved.

BRIEF DESCRIPTION OF DRAWINGS

FIG. 1 is a schematic configuration diagram showing a powertrain of a vehicle.

FIG. 2 is a schematic configuration diagram showing an engine.

FIG. 5 is a diagram showing a state where the ACIS valve is open.

FIG. 7 is a working table of the automatic transmission.

Figure 3:
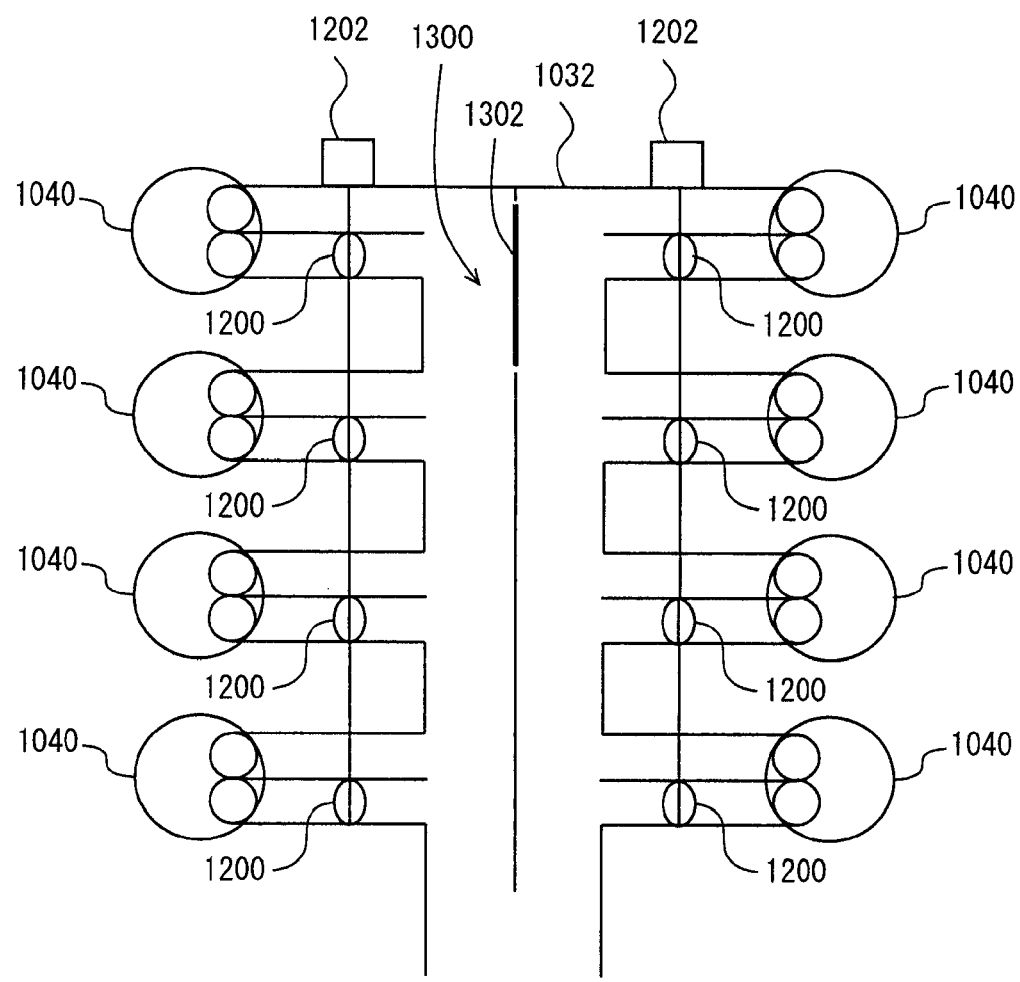
FIG. 3 is a diagram showing a swirl control valve and an ACIS.

REFERENCE SIGNS LIST 1000 engine; 1020 air cleaner; 1030 electronic throttle valve; 1032 intake pipe; 1040 cylinder; 1050 injector; 1060 spark plug; 1070 three-way catalyst; 1080 piston; 1090 crankshaft; 1100 inlet valve; 1110 outlet valve; 1120 intake cam shaft; 1130 exhaust cam shaft; 1200 swirl control valve; 1202 motor; 1300 ACIS; 1302 ACIS valve; 2000 automatic transmission; 2100 torque converter; 3000 planetary gear unit; 4000 oil hydraulic circuit; 5000 propeller shaft; 6000 differential gear; 7000 rear wheel; 8004 shift lever; 8006 position switch; 8008 accelerator pedal; 8010 accelerator pedal position sensor; 8012 air flow meter; 8018 throttle opening position sensor; 8020 engine rotation speed sensor; 8022 input shaft rotation speed sensor; 8024 output shaft rotation speed sensor; 8026 oil temperature sensor; 8028 water temperature sensor; 9000 power train driver model; 9002 static torque setting unit; 9004 converting unit; 9006 drive force converting unit; 9008 accommodating unit; 9010 drivers support system; 9100 power train manager; 9102 accommodating unit; 9104 torque converting unit; 9106 accommodating unit; 9110 VDIM system; 9120 damping control system; 9130 maximum vehicle speed restricting system; 9132 converting unit; 9140 torque controlling system; 9142 converting unit; 9200 engine controlling system; 9202 calculating unit; 9204 controlling unit; 9300 gear shifting unit; 9302 calculating unit; 9304 controlling unit; 9310 idling unit; 9312 calculating unit; 9314 determining unit; 9316 controlling unit

DESCRIPTION OF EMBODIMENTS

An embodiment of the present invention will be described below with reference to the drawings. In the following description, the same parts are denoted by the same reference numerals. Names and functions thereof are all the same. Therefore, a detailed description thereof will not be repeated.

With reference to FIG. 1, a vehicle with a control apparatus according to the embodiment of the present invention installed will be described. This vehicle is an FR (Front engine Rear drive) vehicle. It should be noted that this vehicle may be a vehicle other than the FR vehicle.

The vehicle includes an engine 1000 serving as a driving source, an automatic transmission 2000, a torque converter 2100, a planetary gear unit 3000 constituting part of automatic transmission 2000, an oil hydraulic circuit 4000 constituting part of automatic transmission 2000, a propeller shaft 5000, a differential gear 6000, rear wheels 7000, and an ECU (Electronic Control Unit) 8000.

Engine 1000 is an internal combustion engine for combusting an air-fuel mixture of fuel injected from an injector (not shown) and the air in a combustion chamber of a cylinder. A piston in the cylinder is pushed down by the combustion and a crankshaft is rotated. An auxiliary machine 1004 such as an alternator and an air conditioner is driven by engine 1000.

With reference to FIG. 2, engine 1000 is a V-eight engine in which each of an "A" bank 1010 and a "B" bank 1012 has a group of cylinders formed by four cylinders. It should be noted that the engine installed on the vehicle is not limited to the V-eight engine described below and engines of various specifications can be installed.

Air is taken in engine 1000 from an air cleaner 1020. An amount of the taken air is adjusted by an electronic throttle valve 1030. Electronic throttle valve 1030 is driven by a motor.

It should be noted that the amount of air to be taken in engine 1000 may be adjusted by changing the lift amount or opening/closing phase of an inlet valve 1100 or an outlet valve 1110 instead of or in addition to electronic throttle valve 1030.

The air is introduced into a cylinder 1040 through an intake pipe 1032. The air is mixed with a fuel in cylinder 1040 (combustion chamber). The fuel is directly injected from an injector 1050 to cylinder 1040. In other words, an injection hole of injector 1050 is provided within cylinder 1040.

The fuel is injected in the intake stroke. It should be noted that a timing when the fuel is injected is not limited to the intake stroke. In addition, although engine 1000 is described as a direct injection engine having the injection hole of injector 1050 provided within cylinder 1040 in the present embodiment, an injector for port injection may be provided in addition to injector 1050 for direct injection. Furthermore, only an injector for port injection may be provided.

The air-fuel mixture in cylinder 1040 is ignited by a spark plug 1060 and burns. The air-fuel mixture after combustion, that is, exhaust gas is purified by a three-way catalyst 1070, and then is discharged outside the vehicle. A piston 1080 is pushed down by the combustion of the air-fuel mixture and a crankshaft 1090 is rotated.

Inlet valve 1100 and outlet valve 1110 are provided at the top of cylinder 1040. Inlet valve 1100 is driven by an intake cam shaft 1120. Outlet valve 1110 is driven by an exhaust cam shaft 1130. Intake cam shaft 1120 and exhaust cam shaft 1130 are coupled by a chain, a gear or the like, and rotate at the same rotation speed.

Furthermore, at least one of intake cam shaft 1120 and exhaust cam shaft 1130 is coupled to crankshaft 1090 by a chain, a belt or the like. Intake cam shaft 1120 and exhaust cam shaft 1130 rotate at the rotation speed that is half of that of crankshaft 1090.

The phase (opening/closing timing) of inlet valve 1100 is controlled by an intake VVT mechanism provided at intake cam shaft 1120. The phase (opening/closing timing) of outlet valve 1110 is controlled by an exhaust VVT mechanism provided at exhaust cam shaft 1130.

In the present embodiment, intake cam shaft 1120 and exhaust cam shaft 1130 are rotated by the VVT mechanisms, whereby the phases of inlet valve 1100 and outlet valve 1110 are controlled. It should be noted that a method of controlling the phases is not limited thereto.

The intake VVT mechanism and the exhaust VVT mechanism are actuated by an electric motor. It should be noted that the intake VVT mechanism and the exhaust VVT mechanism may be actuated by the oil pressure. In addition, since a known technique may be used for the VVT mechanisms, a detailed description thereof will not be repeated here. Furthermore, the phase of only one of inlet valve 1100 and outlet valve 1110 may be changed.

With reference to FIG. 3, engine 1000 is provided with a swirl control valve 1200 and an ACIS (Acoustic Control Induction System) 1300.

Swirl control valve 1200 is provided at one of two intake ports coupled to cylinder 1040. When swirl control valve 1200 is closed, the flow velocity of air flowing through the other port increases. Thus, a lateral turbulent flow in cylinder 1040 is intensified. As a result, atomization of the fuel is promoted. Swirl control valve 1200 is opened and closed using drive force of a motor 1202.

ACIS 1300 switches the length of intake pipe 1032 to two stages by opening and closing an ACIS valve 1302. More specifically, ACIS 1300 switches the effective length of intake pipe 1032 to the two stages. When ACIS valve 1302 is closed, the effective length of intake pipe 1032 increases as shown by an oblique line in FIG. 4. When ACIS valve 1302 is opened, the effective length of intake pipe 1032 decreases as shown by an oblique line in FIG. 5.

Output torque of engine 1000 (engine torque TE) is changed in accordance with an actuated amount of electronic throttle valve 1030, that is, a throttle opening position, an opening position of swirl control valve 1200, the length of intake pipe 1032 or the like. It should be noted that a motor may be used as a power source instead of or in addition to engine 1000. Alternatively, a diesel engine may be used. In the diesel engine, output torque is changed in accordance with the valve opening time (the actuated amount) of the injector, that is, a fuel injection amount.

Returning to FIG. 1, automatic transmission 2000 is coupled to engine 1000 with torque converter 2100 interposed therebetween. Automatic transmission 2000 implements a desired gear so as to shift the rotation speed of the crankshaft to a desired rotation speed. It should be noted that a CVT (Continuously Variable Transmission) for continuously changing a gear ratio may be installed instead of the automatic transmission implementing a gear. Further, another automatic transmission configured by a constant-meshing type gear shifted by an oil hydraulic actuator or an electric motor may be installed.

Drive force outputted from automatic transmission 2000 is transmitted to right and left rear wheels 7000 through propeller shaft 5000 and differential gear 6000.

A position switch 8006 of a shift lever 8004, an accelerator pedal position sensor 8010 of an accelerator pedal 8008, an air flow meter 8012, a throttle opening position sensor 8018 of electronic throttle valve 1030, an engine rotation speed sensor 8020, an input shaft rotation speed sensor 8022, an output shaft rotation speed sensor 8024, an oil temperature sensor 8026, and a water temperature sensor 8028 are connected to ECU 8000 with a harness and the like interposed therebetween.

A position of shift lever 8004 is detected by position switch 8006, and a signal representing a detection result is transmitted to ECU 8000. The gear of automatic transmission 2000 is automatically implemented in response to the position of shift lever 8004. A driver may select a manual shift mode in which the driver can select any gear in accordance with operations of the driver.

Accelerator pedal position sensor 8010 detects a position of accelerator pedal 8008 and transmits a signal representing a detection result to ECU 8000. Air flow meter 8012 detects an amount of air to be taken in engine 1000 and transmits a signal representing a detection result to ECU 8000.

Throttle opening position sensor 8018 detects an opening position of electronic throttle valve 1030 adjusted by an actuator and transmits a signal representing a detection result to ECU 8000.

Engine rotation speed sensor 8020 detects the rotation speed of an output shaft (crankshaft 1090) of engine 1000 (hereinafter, also referred to as engine rotation speed NE) and transmits a signal representing a detection result to ECU 8000. Input shaft rotation speed sensor 8022 detects an input shaft rotation speed NI of automatic transmission 2000 (a turbine rotation speed NT of torque converter 2100) and transmits a signal representing a detection result to ECU 8000. Output shaft rotation speed sensor 8024 detects an output shaft rotation speed NO of automatic transmission 2000 and transmits a signal representing a detection result to ECU 8000.

Oil temperature sensor 8026 detects a temperature (an oil temperature) of oil used for actuating and lubricating automatic transmission 2000 (ATF: Automatic Transmission Fluid) and transmits a signal representing a detection result to ECU 8000.

Water temperature sensor 8028 detects a temperature (a water temperature) of coolant of engine 1000 and transmits a signal representing a detection result to ECU 8000.

ECU 8000 controls devices such that the vehicle is in a desired traveling state, based on the signals transmitted from position switch 8006, accelerator pedal position sensor 8010, air flow meter 8012, throttle opening position sensor 8018, engine rotation speed sensor 8020, input shaft rotation speed sensor 8022, output shaft rotation speed sensor 8024, oil temperature sensor 8026, water temperature sensor 8028, and the like, a map and a program stored in a ROM (Read Only Memory) 8002. It should be noted that the program to be executed by ECU 8000 may be recorded in a recording medium such as a CD (Compact Disc) and a DVD (Digital Versatile Disc) and distributed on the market.

In the present embodiment, ECU 8000 controls automatic transmission 2000 such that any of first to eighth forward gears is implemented in the case where a D (drive) range is selected as a shift range of automatic transmission 2000 by placing shift lever 8004 at a D (drive) position. Since any gear among the first to eighth forward gears is implemented, automatic transmission 2000 can transmit the drive force to rear wheels 7000. It should be noted that a gear of a higher speed than the eighth gear may be implemented in the D range. A gear to be implemented is determined based on a shift map preliminarily prepared by an experiment or the like taking the vehicle speed and the accelerator pedal position as parameters. It should be noted that ECU may be divided into a plurality of ECUs.

Figure 6:
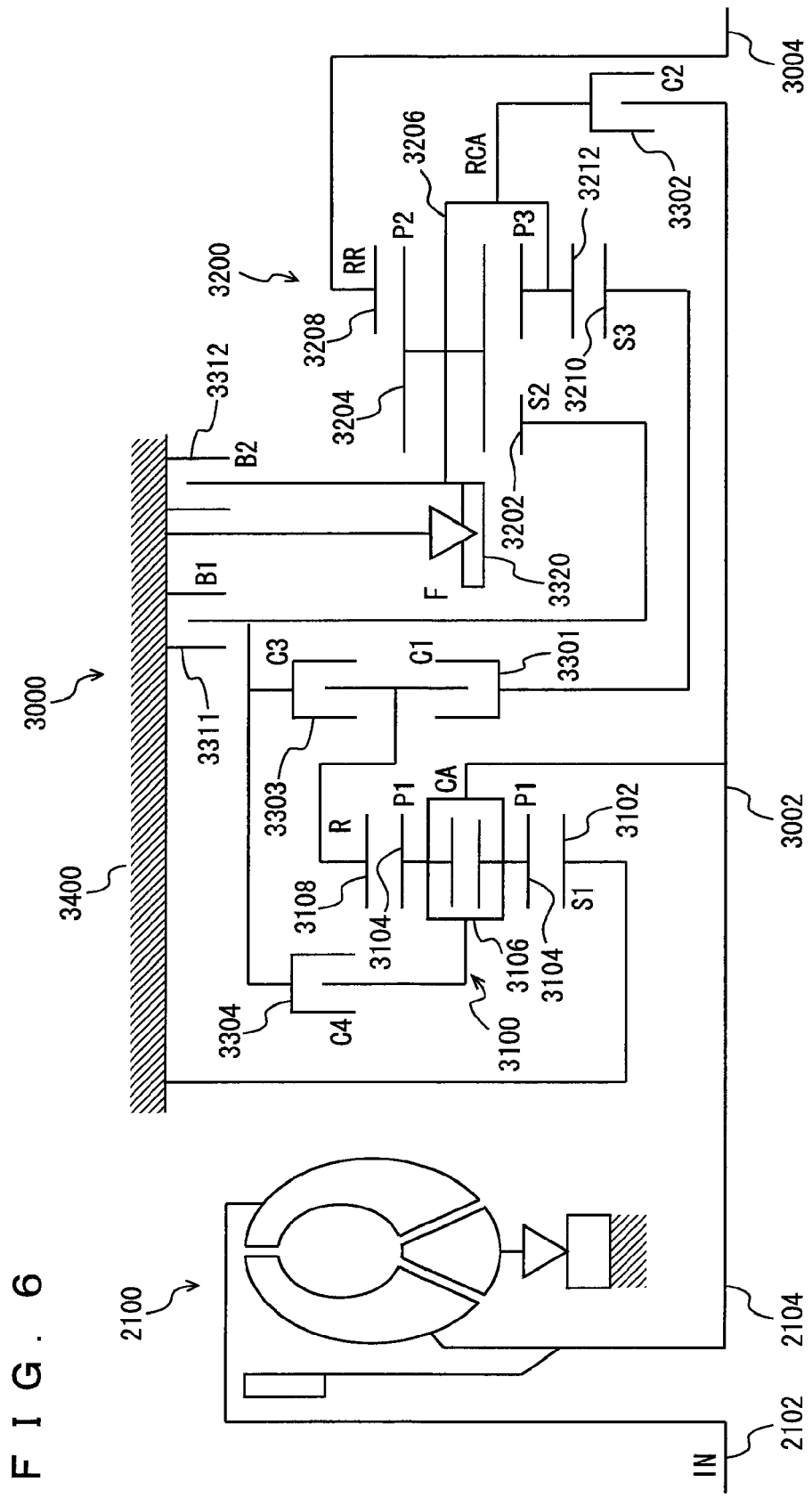
FIG. 6 is a skeleton diagram showing a planetary gear unit of an automatic transmission.

With reference to FIG. 6, planetary gear unit 3000 will be described. Planetary gear unit 3000 is connected to torque converter 2100 having an input shaft 2102 coupled to the crankshaft.

Planetary gear unit 3000 includes a front planetary 3100, a rear planetary 3200, a C1 clutch 3301, a C2 clutch 3302, a C3 clutch 3303, a C4 clutch 3304, a B1 brake 3311, a B2 brake 3312, and a one-way clutch (F) 3320.

Front planetary 3100 is a planetary gear mechanism of a double pinion type. Front planetary 3100 includes a first sun gear (S1) 3102, a pair of first pinion gears (P1) 3104, a carrier (CA) 3106, and a ring gear (R) 3108.

First pinion gears (P1) 3104 are meshed with first sun gear (S1) 3102 and first ring gear (R) 3108. First carrier (CA) 3106 supports first pinion gears (P1) 3104 such that first pinion gears (P1) 3104 can be rotated around an outer axis and also around their own axes.

First sun gear (S1) 3102 is fixed to a gear case 3400 so as not to rotate. First carrier (CA) 3106 is coupled to an input shaft 3002 of planetary gear unit 3000.

Rear planetary 3200 is a Ravigneaux type planetary gear mechanism. Rear planetary 3200 includes a second sun gear (S2) 3202, a second pinion gear (P2) 3204, a rear carrier (RCA) 3206, a rear ring gear (RR) 3208, a third sun gear (S3) 3210, and a third pinion gear (P3) 3212.

Second pinion gear (P2) 3204 is meshed with second sun gear (S2) 3202, rear ring gear (RR) 3208 and third pinion gear (P3) 3212. Third pinion gear (P3) 3212 is meshed with third sun gear (S3) 3210 in addition to second pinion gear (P2) 3204.

Rear carrier (RCA) 3206 supports second pinion gear (P2) 3204 and third pinion gear (P3) 3212 such that second pinion gear (P2) 3204 and third pinion gear (P3) 3212 can be rotated around an outer axis and also around their own axes. Rear carrier (RCA) 3206 is coupled to one-way clutch (F) 3320. Rear carrier (RCA) 3206 cannot be rotated at the time of driving in the first gear (when the vehicle travels by using drive force outputted from engine 1000). Rear ring gear (RR) 3208 is coupled to an output shaft 3004 of planetary gear unit 3000.

One-way clutch (F) 3320 is provided in parallel to B2 brake 3312. That is, an outer race of one-way clutch (F) 3320 is fixed to gear case 3400, and an inner race is coupled to rear carrier (RCA) 3206.

FIG. 7 shows a working table illustrating a relationship between the shift gears and working states of the clutches and the brakes. First to eighth forward gears and first and second reverse gears are implemented by actuating the brakes and the clutches in combinations shown in this working table.

Figure 8:
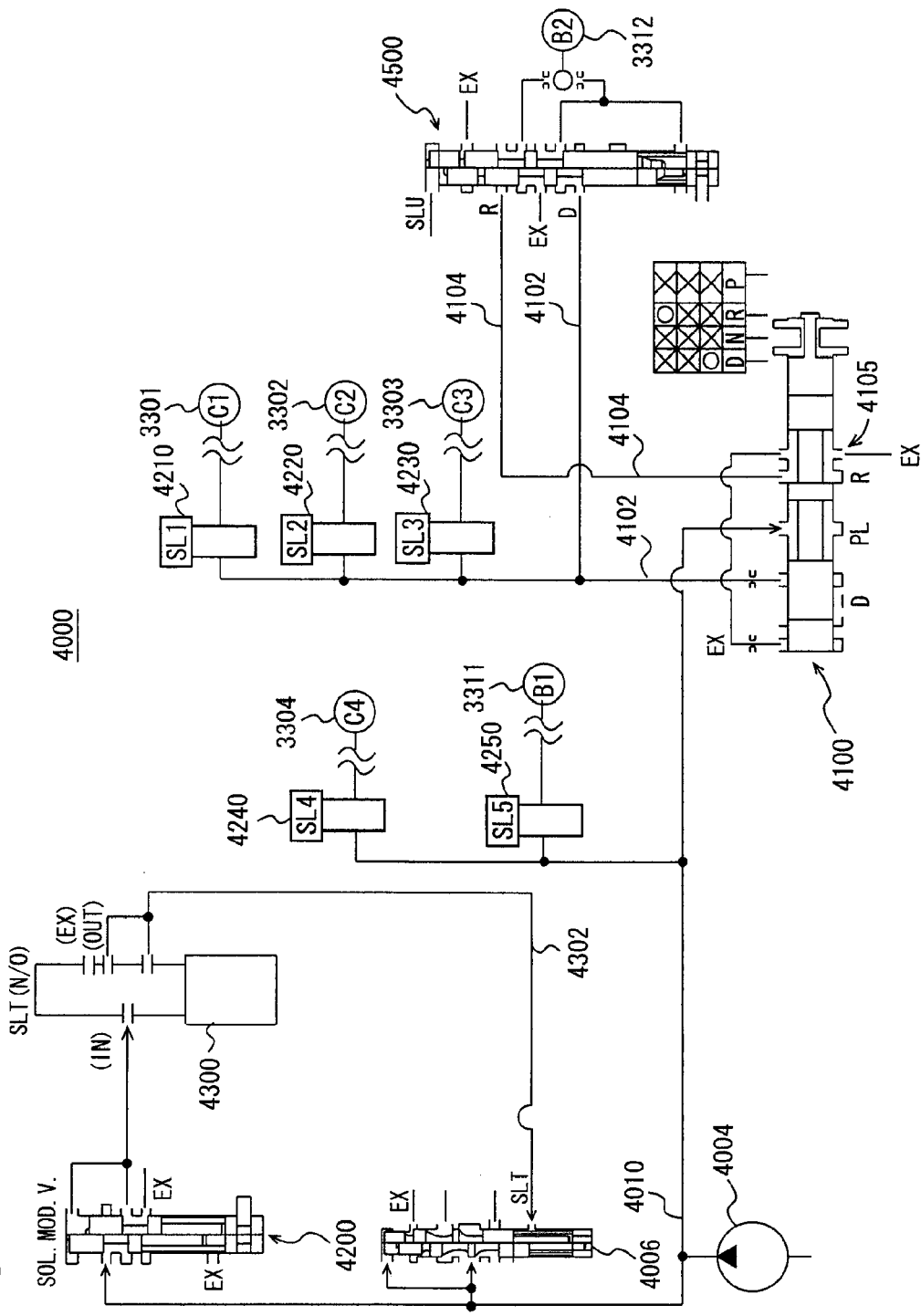
FIG. 8 is a diagram showing an oil hydraulic circuit of the automatic transmission.

With reference to FIG. 8, a principal portion of oil hydraulic circuit 4000 will be described. It should be noted that oil hydraulic circuit 4000 is not limited to the one described below.

Oil hydraulic circuit 4000 includes an oil pump 4004, a primary regulator valve 4006, a manual valve 4100, a solenoid modulator valve 4200, an SL1 linear solenoid (hereinafter, indicated as SL (1)) 4210, an SL2 linear solenoid (hereinafter, indicated as SL (2)) 4220, an SL3 linear solenoid (hereinafter, indicated as SL (3)) 4230, an SL4 linear solenoid (hereinafter, indicated as SL (4)) 4240, an SL5 linear solenoid (hereinafter, indicated as SL (5)) 4250, an SLT linear solenoid (hereinafter, indicated as SLT) 4300, and a B2 control valve 4500.

Oil pump 4004 is coupled to the crankshaft of engine 1000. Oil pump 4004 is driven by rotation of the crankshaft so as to generate oil pressure. The oil pressure generated in oil pump 4004 is regulated by primary regulator valve 4006 so as to generate line pressure.

Primary regulator valve 4006 is actuated taking throttle pressure regulated by SLT 4300 as pilot pressure. The line pressure is supplied to manual valve 4100 through a line pressure oil channel 4010.

Manual valve 4100 includes a drain port 4105. The oil pressure of a D range pressure oil channel 4102 and an R range pressure oil channel 4104 is discharged from drain port 4105. In the case where a spool of manual valve 4100 is at a D position, line pressure oil channel 4010 communicates with D range pressure oil channel 4102. Therefore, the oil pressure is supplied to D range pressure oil channel 4102. At this point, R range pressure oil channel 4104 communicates with drain port 4105. Therefore, R range pressure of R range pressure oil channel 4104 is discharged from drain port 4105.

In the case where the spool of manual valve 4100 is at an R position, line pressure oil channel 4010 communicates with R range pressure oil channel 4104. Therefore, the oil pressure is supplied to R range pressure oil channel 4104. At this point, D range pressure oil channel 4102 communicates with drain port 4105. Therefore, D range pressure of D range pressure oil channel 4102 is discharged from drain port 4105.

In the case where the spool of manual valve 4100 is at an N position, both D range pressure oil channel 4102 and R range pressure oil channel 4104 communicate with drain port 4105. Therefore, the D range pressure of D range pressure oil channel 4102 and the R range pressure of R range pressure oil channel 4104 are discharged from drain port 4105.

The oil pressure supplied to D range pressure oil channel 4102 is eventually supplied to C1 clutch 3301, C2 clutch 3302 and C3 clutch 3303. The oil pressure supplied to R range pressure oil channel 4104 is eventually supplied to B2 brake 3312.

Solenoid modulator valve 4200 regulates the oil pressure to be supplied to SLT 4300 (solenoid modulator pressure) to a constant level taking the line pressure as base pressure.

SL (1) 4210 regulates the oil pressure supplied to C1 clutch 3301. SL (2) 4220 regulates the oil pressure supplied to C2 clutch 3302. SL (3) 4230 regulates the oil pressure supplied to C3 clutch 3303. SL (4) 4240 regulates the oil pressure supplied to C4 clutch 3304. SL (5) 4250 regulates the oil pressure supplied to B1 brake 3311.

SLT 4300 regulates the solenoid modulator pressure in accordance with a control signal from ECU 8000 based on the accelerator pedal position detected by accelerator pedal position sensor 8010 so as to generate the throttle pressure. The throttle pressure is supplied to primary regulator valve 4006 through an SLT oil channel 4302. The throttle pressure is used as the pilot pressure of primary regulator valve 4006.

SL (1) 4210, SL (2) 4220, SL (3) 4230, SL (4) 4240, SL (5) 4250, and SLT 4300 are controlled by the control signal sent from ECU 8000.

B2 control valve 4500 selectively supplies the oil pressure from one of D range pressure oil channel 4102 and R range pressure oil channel 4104 to B2 brake 3312. D range pressure oil channel 4102 and R range pressure oil channel 4104 are connected to B2 control valve 4500. B2 control valve 4500 is controlled by the oil pressure supplied from an SLU solenoid valve (not shown) and the biasing force of a spring.

Figure 4:
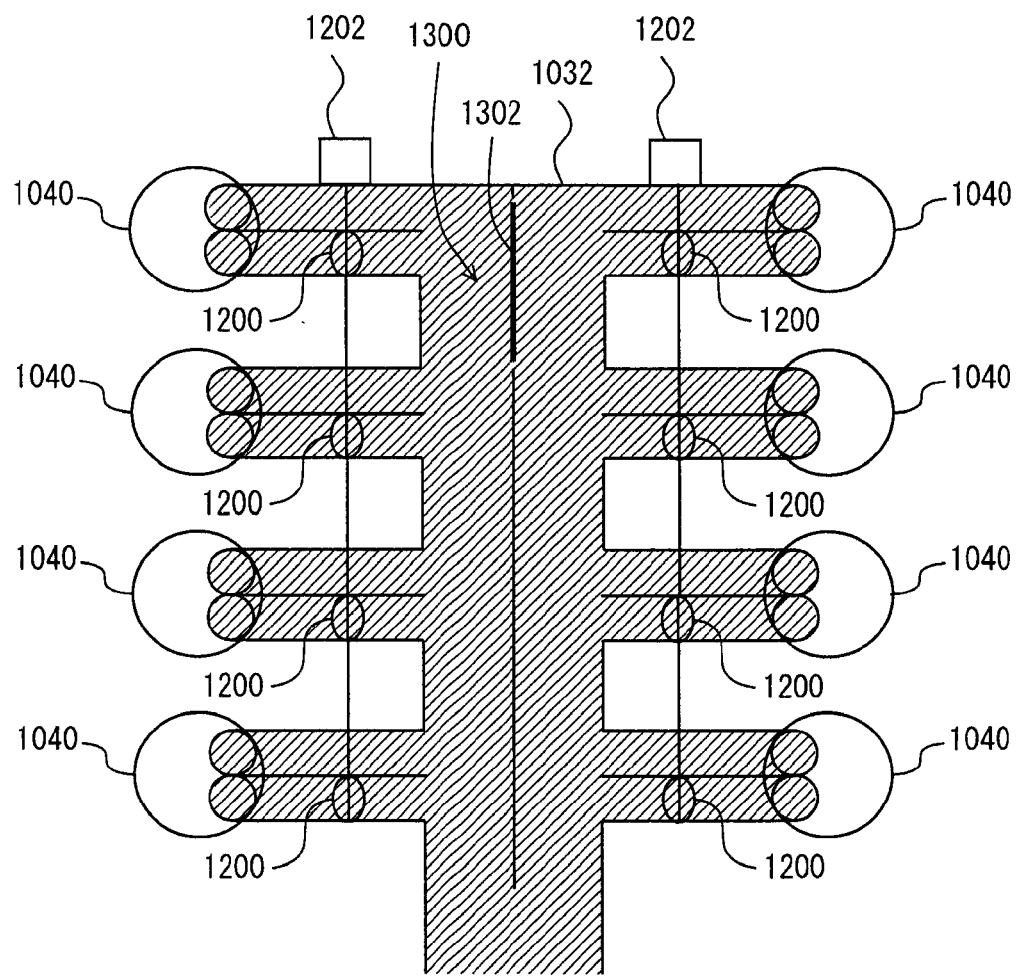
FIG. 4 is a diagram showing a state where an ACIS valve is closed.

In the case where the SLU solenoid valve is ON, B2 control valve 4500 attains the left side state of FIG. 4. In this case, B2 brake 3312 is supplied with oil pressure obtained by regulating the D range pressure taking the oil pressure supplied from the SLU solenoid valve as the pilot pressure.

In the case where the SLU solenoid valve is OFF, B2 control valve 4500 attains the right side state of FIG. 4. In this case, B2 brake 3312 is supplied with the R range pressure.

Figure 9:
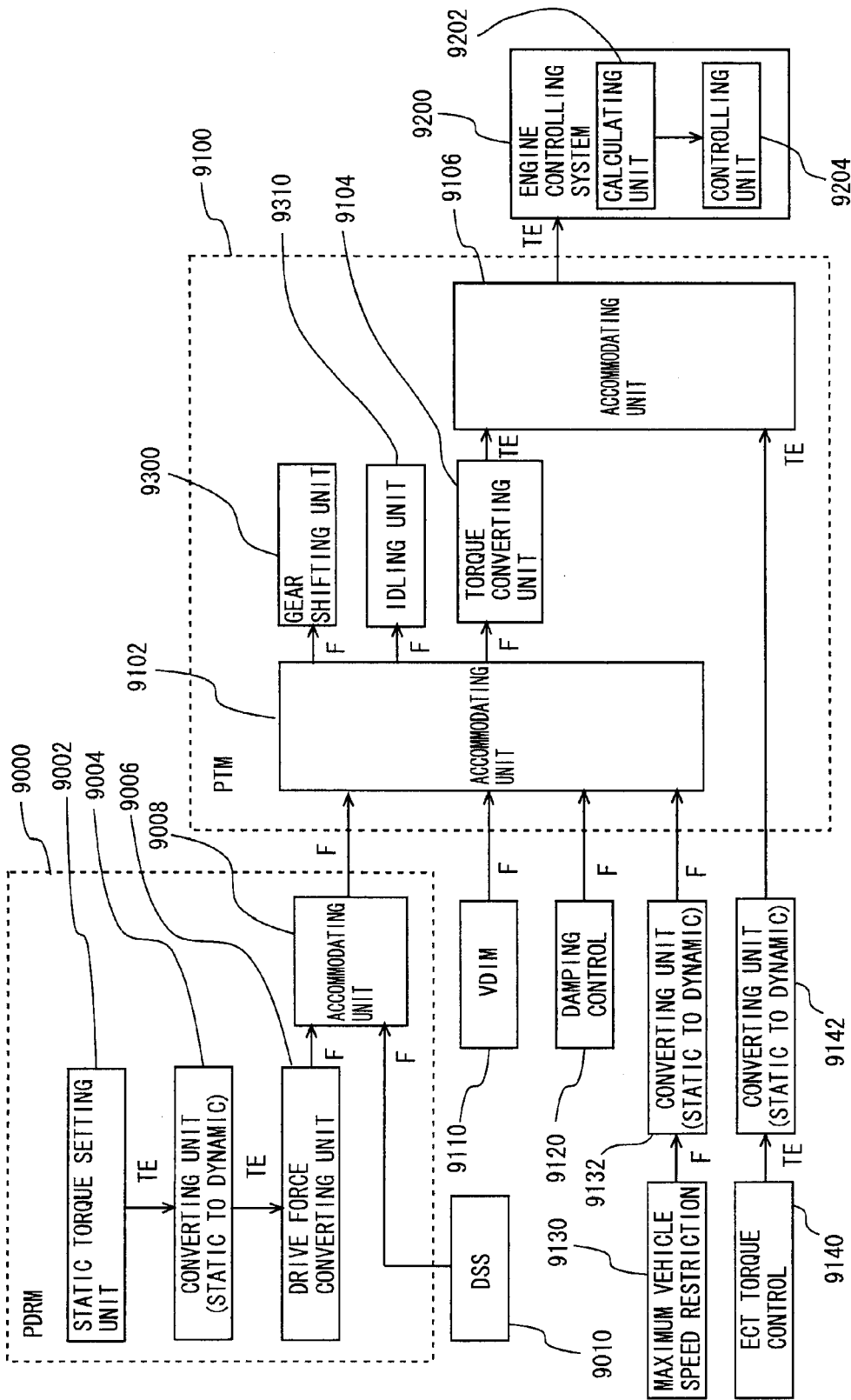
FIG. 9 is a diagram showing a system configuration of a control apparatus according to the present embodiment.

With reference to FIG. 9, a system configuration of the control apparatus according to the present embodiment will be described. "F" indicates the drive force, and "TE" indicates the engine torque, in FIG. 9. It should be noted that functions of the configuration described below may be implemented by either hardware or software.

As shown in FIG. 9, the control apparatus includes a power train driver model (PDRM) 9000, a drivers support system (DSS) 9010, a power train manager (PTM) 9100, a VDIM (Vehicle Dynamics Integrated Management) system 9110, a damping control system 9120, a maximum vehicle speed restricting system 9130, an ECT (Electronic Controlled Transmission) torque controlling system 9140, and an engine controlling system 9200.

Power train driver model 9000 is a model (a function) used for setting target drive force of the driver relative to the vehicle based on the operations of the driver. In the present embodiment, the target drive force (a target value of the drive force) is set from the accelerator pedal position in accordance with an engine torque map predetermined based on results of an experiment, a simulation, and the like.

Figure 10:
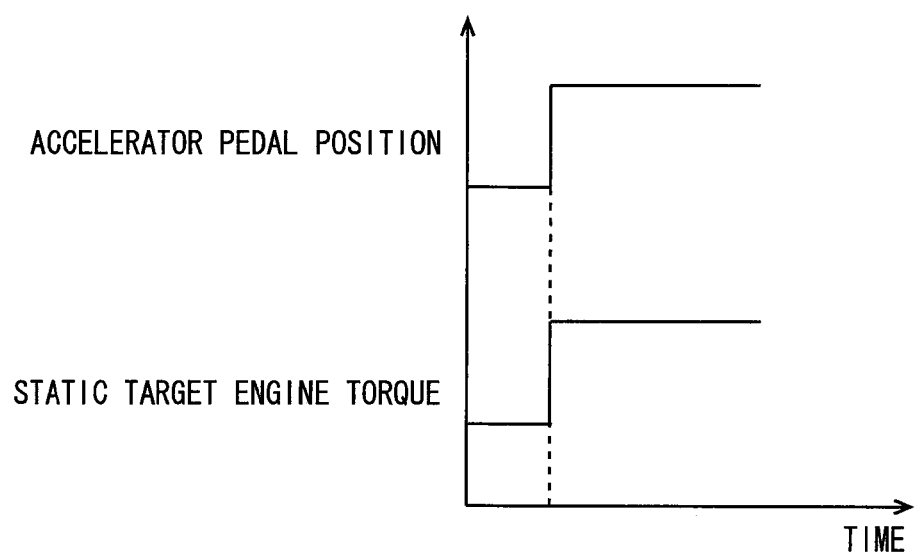
FIG. 10 is a graph showing static target engine torque.

More specifically, static target engine torque relative to engine 1000 (a target value of output torque of engine 1000) is set from the accelerator pedal position in a static torque setting unit 9002. The static target engine torque indicates target engine torque in a state where the output torque of engine 1000 is stabilized. The static target engine torque is determined without consideration of temporal influences such as a response property of the device including electronic throttle valve 1030 and a delay at the time of controlling as shown in FIG. 10.

Since the drive force of the vehicle is changed in accordance with the output torque of engine 1000, the target engine torque is a target value for the drive force of the vehicle. Instead of the target engine torque, target input torque (a target value of input torque) of automatic transmission 2000 may be set.

The static target engine torque set in static torque setting unit 9002 is converted into dynamic target engine torque in a converting unit 9004. The dynamic target engine torque indicates target engine torque in a transition state where the output torque of engine 1000 may change. The dynamic target engine torque is determined in consideration of the temporal influences such as the response property of the device including electronic throttle valve 1030 and the delay at the time of controlling.

Figure 11:
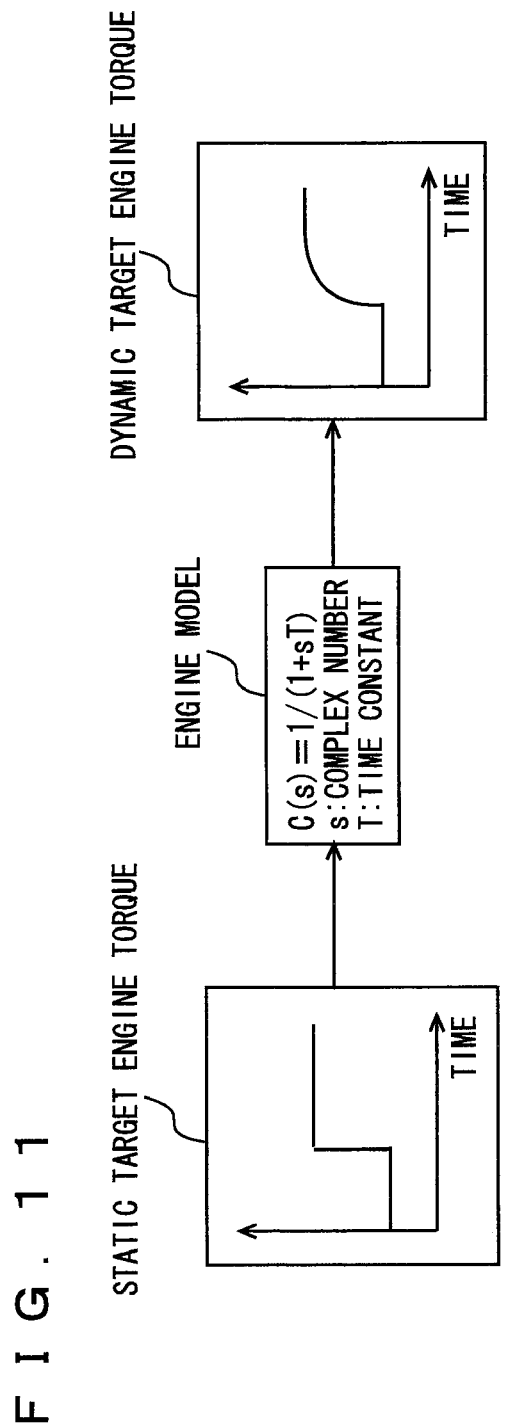
FIG. 11 is a diagram showing an engine model represented by a primary delay function.
Figure 12:
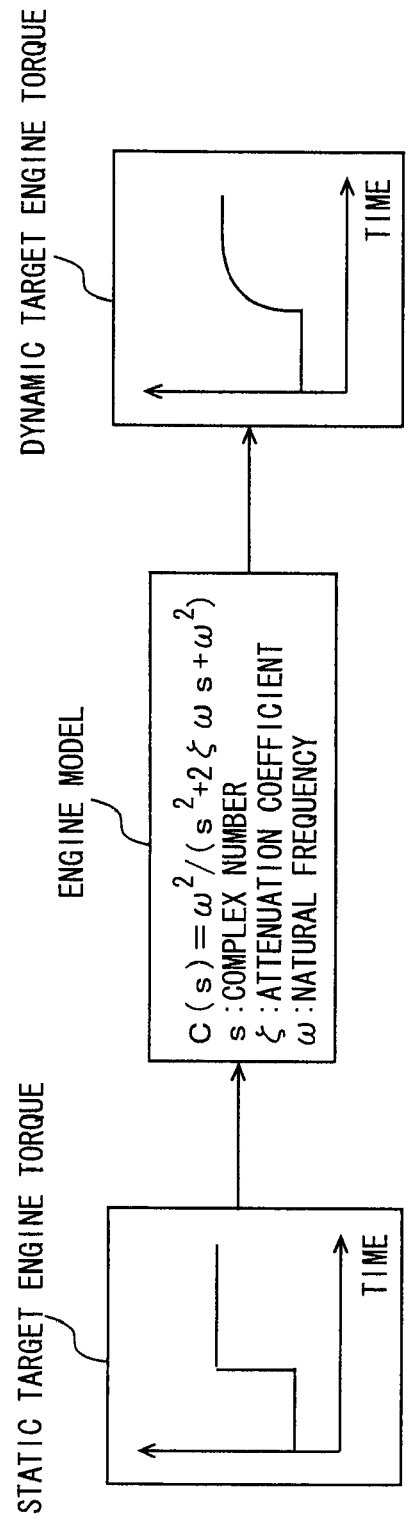
FIG. 12 is a diagram showing an engine model represented by a secondary delay function.

For example, as shown in FIG. 11, the static target engine torque is converted into the dynamic target engine torque by adding a delay at the time of controlling (actuating) the device such as electronic throttle valve 1030 to the static target engine torque using an engine model C (s) represented by a primary delay function. A time constant of the engine model shown in FIG. 11 is changed by engine rotation speed NE and the engine torque. It should be noted that an engine model C (s) represented by a secondary delay function may be used as shown in FIG. 12. These engine models are z-transformed when installed in ECU 8000.

Figure 13:
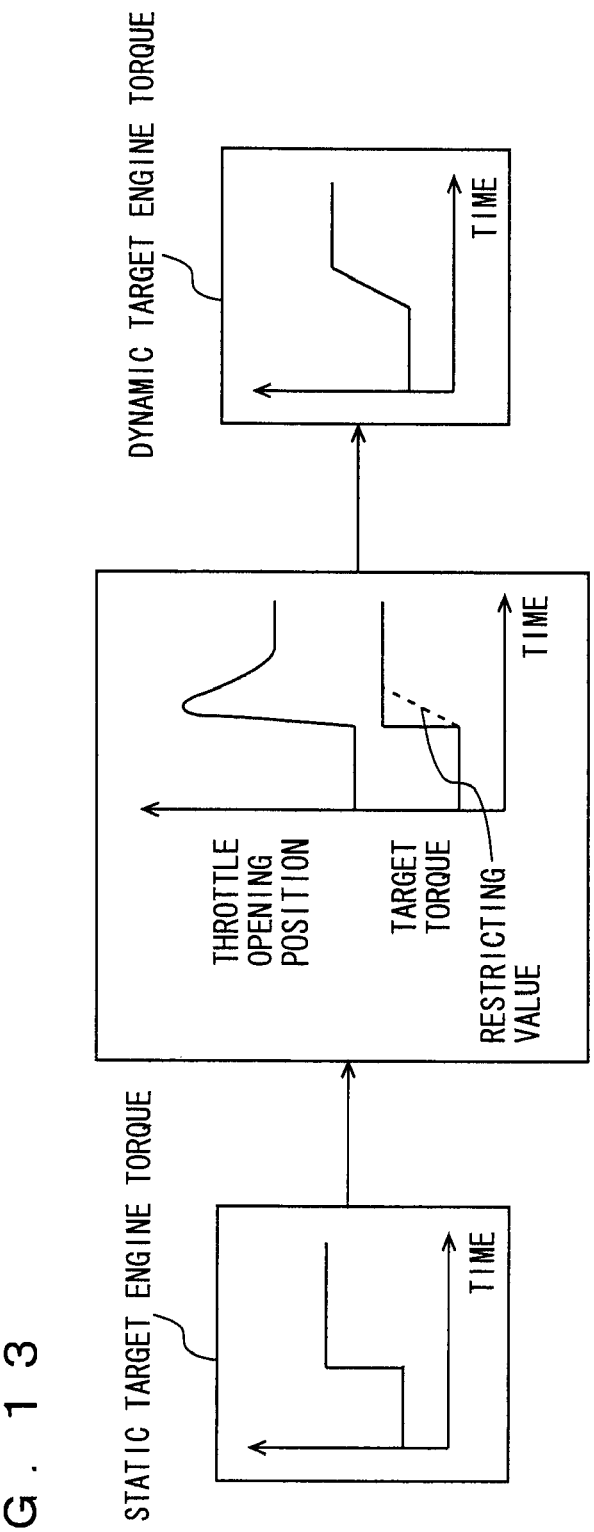
FIG. 13 is a diagram showing dynamic target engine torque obtained by restricting the static target engine torque with a limit value determined in accordance with a response property of a device.

As shown in FIG. 13, the static target engine torque may be converted into the dynamic target engine torque by restricting the static target engine torque with a restricting value determined in accordance with the response property of the device such as electronic throttle valve 1030. The restricting value is predetermined for example by an experiment, a simulation, and the like.

Returning to FIG. 9, the dynamic target engine torque converted from the static target engine torque is converted into dynamic target drive force in a drive force converting unit 9006. The dynamic target drive force indicates target drive force in a transition state where the drive force of the vehicle may change. On the other hand, the static target drive force indicates target drive force in a state where the drive force of the vehicle is stabilized.

For example, the target engine torque is converted into the target drive force by multiplying the target engine torque by a current gear ratio of automatic transmission 2000 and a gear ratio of differential gear 6000 and then dividing the same by a radius of rear wheels 7000. It should be noted that a generally well-known technique may be used for a method of converting the torque into the drive force. Therefore, a further detailed description will not be repeated here.

An accommodating unit 9008 accommodates the dynamic target drive force converted from the dynamic target engine torque in drive force converting unit 9006 and the dynamic target drive force set by drivers support system 9010. In the present embodiment, larger target drive force of the dynamic target drive force converted in drive force converting unit 9006 and the dynamic target drive force set by drivers support system 9010 is selected and outputted to power train manager 9100.

Drivers support system 9010 automatically sets the dynamic target drive force in accordance with the behavior of the vehicle by a cruise control system, a parking assist system, a pre-crash safety system, and the like.

Power train manager 9100 sets the dynamic target drive force used for controlling automatic transmission 2000 based on the dynamic target drive forces inputted from power train driver model 9000, VDIM system 9110, damping control system 9120, and maximum vehicle speed restricting system 9130.

More specifically, an accommodating unit 9102 accommodates the dynamic target drive forces inputted from power train driver model 9000, VDIM system 9110, damping control system 9120, and maximum vehicle speed restricting system 9130. In the present embodiment, the minimum target drive force is selected. As a result, the dynamic target drive force used for controlling automatic transmission 2000 is set.

Figure 14:
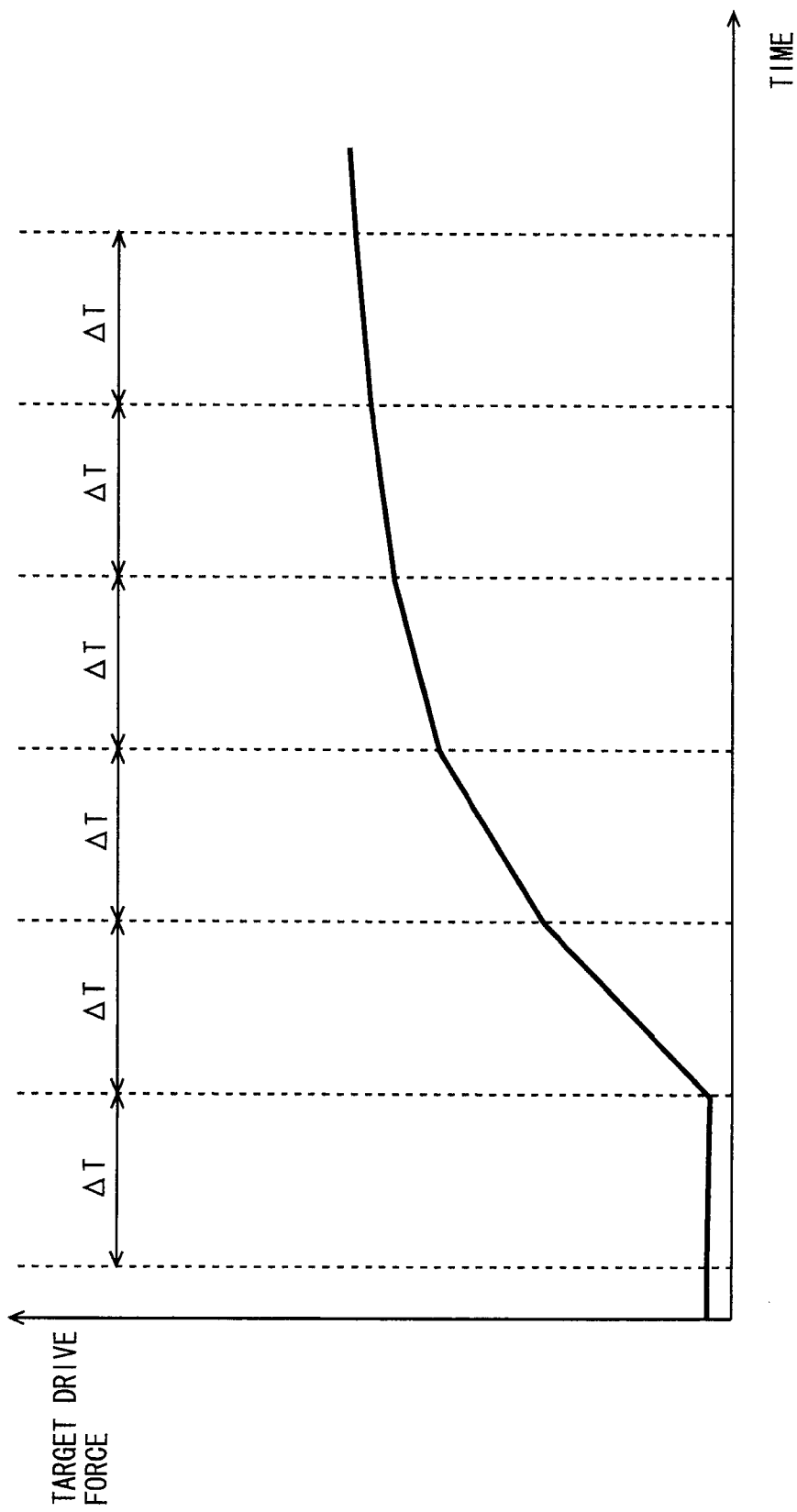
FIG. 14 is a graph showing target drive force.

It should be noted that the dynamic target drive force is set periodically at an interval $\Delta T$ determined by a clock of ECU 8000 or the like as shown by a solid line in FIG. 14.

Returning to FIG. 9, the dynamic target drive force set (selected) in accommodating unit 9102 is inputted to a gear shifting unit 9300 and an idling unit 9310.

Figure 15:
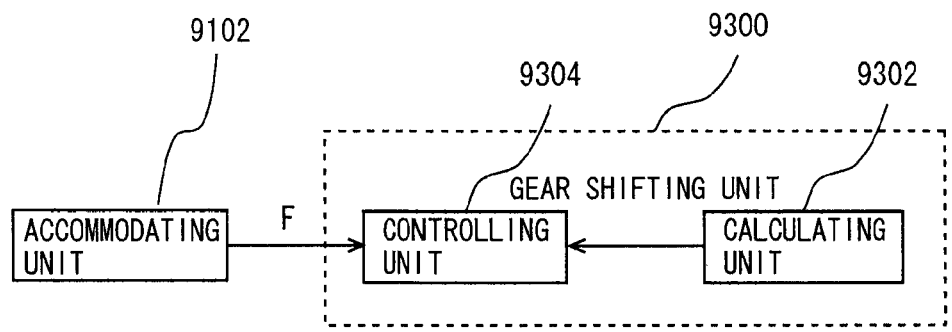
FIG. 15 is a diagram showing a gear shifting unit.

As shown in FIG. 15, gear shifting unit 9300 includes a calculating unit 9302 and a controlling unit 9304. Calculating unit 9302 calculates a second shift line (a second downshift line and a second upshift line) which is a dynamic threshold value, in accordance with a first shift line (a first downshift line and a first upshift line) which is a static threshold value for defining the target drive force that allows shifting gears (downshifting and upshifting) of automatic transmission 2000.

The static threshold value here indicates a threshold value determined based on the state where the drive force of the vehicle is stabilized, that is, the state where engine 1000, automatic transmission 2000 and the like are stabilized.

The static threshold value indicates a threshold value for the transition state where the drive force of the vehicle may change, that is, the transition state of engine 1000, automatic transmission 2000 and the like.

The static first shift line is predetermined by a developer for each type of shifting (combination of a gear before shifting and a gear after shifting), based on results of an experiment, a simulation, and the like.

Figure 16:
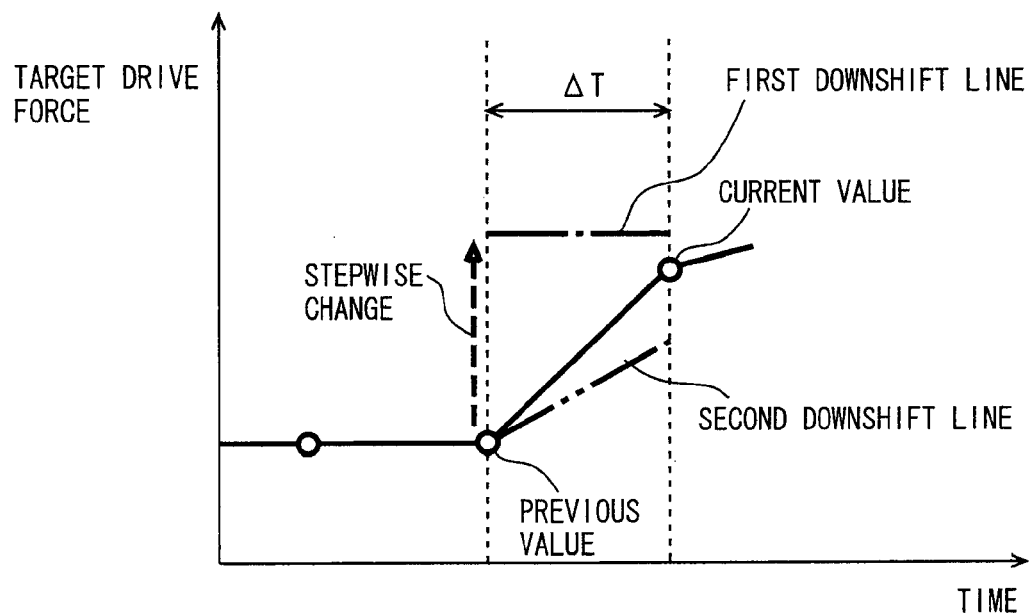
FIG. 16 is a graph (No. 1) showing the target drive force, a static first downshift line and a dynamic second downshift line.

For example, a value that changes with a delay with respect to a stepwise change from the dynamic target drive force shown by a solid line in FIG. 16 to the static first downshift line shown by a chain line is calculated as the dynamic second downshift line shown by a two-dot chain line.

More specifically, the value that changes with the delay with respect to the stepwise change from a previous value of the dynamic target drive force to the static first downshift line is calculated as the second downshift line. A primary delay response to the stepwise change from the previous value of the dynamic target drive force to the static first downshift line is calculated as the second downshift line.

Figure 17:
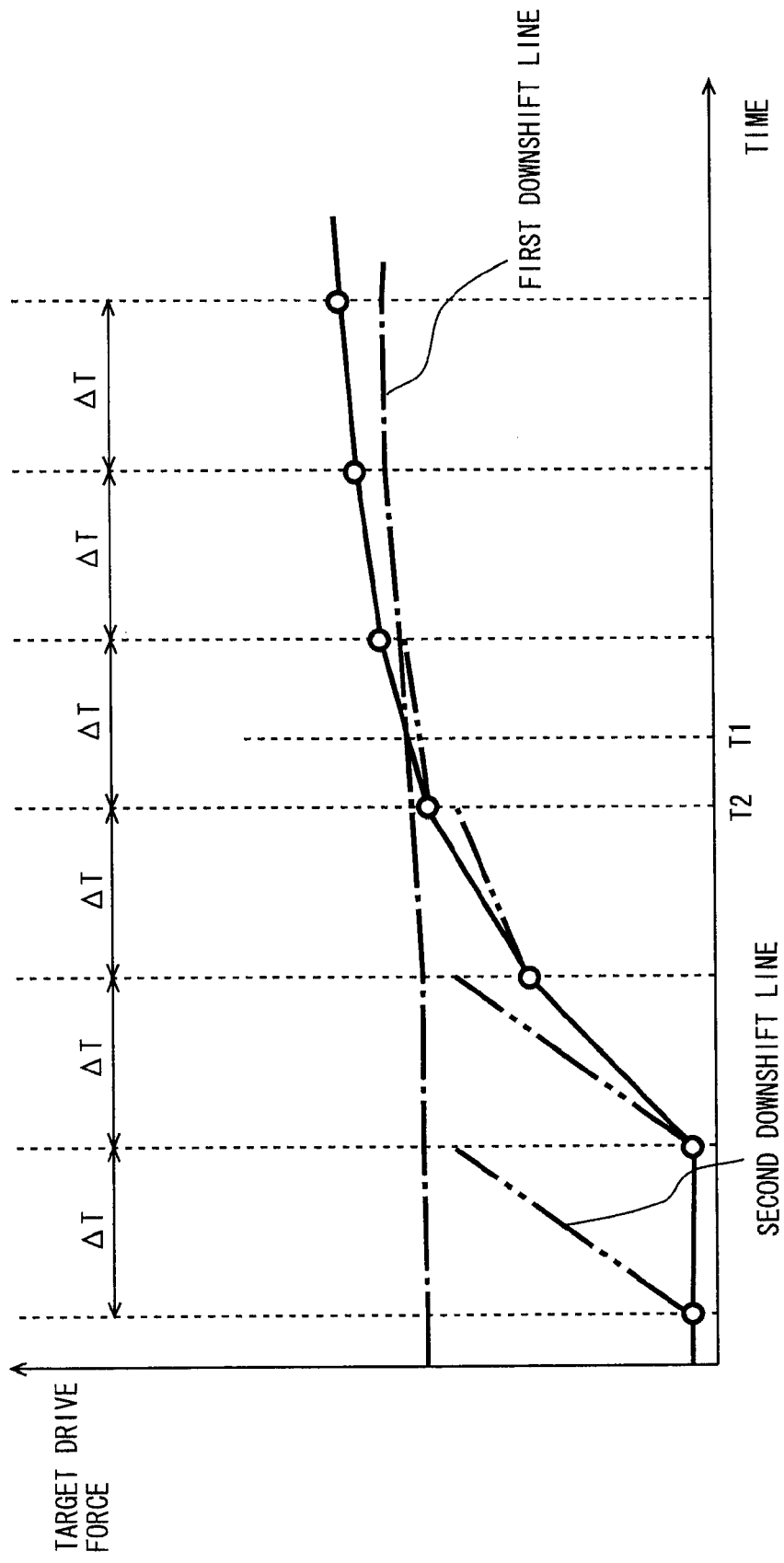
FIG. 17 is a graph (No. 2) showing the target drive force, the static first downshift line and the dynamic second downshift line.

As shown in FIG. 17, the dynamic second downshift line is calculated periodically at the same interval as interval $\Delta T$ during which the dynamic target drive force is set.

Comparing the dynamic target drive force and the static first downshift line, the dynamic target drive force is larger than the static first downshift line at time T1. Comparing the dynamic target drive force and the dynamic second downshift line, the dynamic target drive force is larger than the dynamic second downshift line at time T2 that is earlier than time T1. Therefore, determination of downshifting can be made earlier by comparing the dynamic target drive force with the dynamic second downshift line instead of the static first downshift line.

The dynamic second downshift line is calculated using engine model C (s) shown in FIG. 11 used in converting unit 9004 of power train driver model 9000. The dynamic second downshift line may be calculated using engine model C (s) represented by the secondary delay function as shown in FIG. 12.

It should be noted that the dynamic second upshift line may be calculated using a method similar to the method of calculating the dynamic second downshift line, and thus, a detailed description thereof will not be repeated here.

Returning to FIG. 15, controlling unit 9304 controls automatic transmission 2000 in accordance with a result of comparison between the dynamic target drive force and the dynamic second shift line (the first downshift line and the first upshift line).

More specifically, controlling unit 9304 controls automatic transmission 2000 in accordance with a result of comparison between a current value of the dynamic target drive force and the dynamic second shift line (the first downshift line and the first upshift line).

Automatic transmission 2000 is controlled to shift gears in accordance with whether the current value of the dynamic target drive force is larger or smaller than the dynamic second shift line.

For example, automatic transmission 2000 is controlled to implement downshifting when the current value of the dynamic target drive force is larger than the dynamic second downshift line, and not to implement downshifting when the current value of the dynamic target drive force is smaller than the dynamic second downshift line. In addition, automatic transmission 2000 is controlled to implement upshifting when the current value of the dynamic target drive force is smaller than the second upshift line, and not to implement upshifting when the current value of the dynamic target drive force is larger than the second upshift line.

Figure 18:
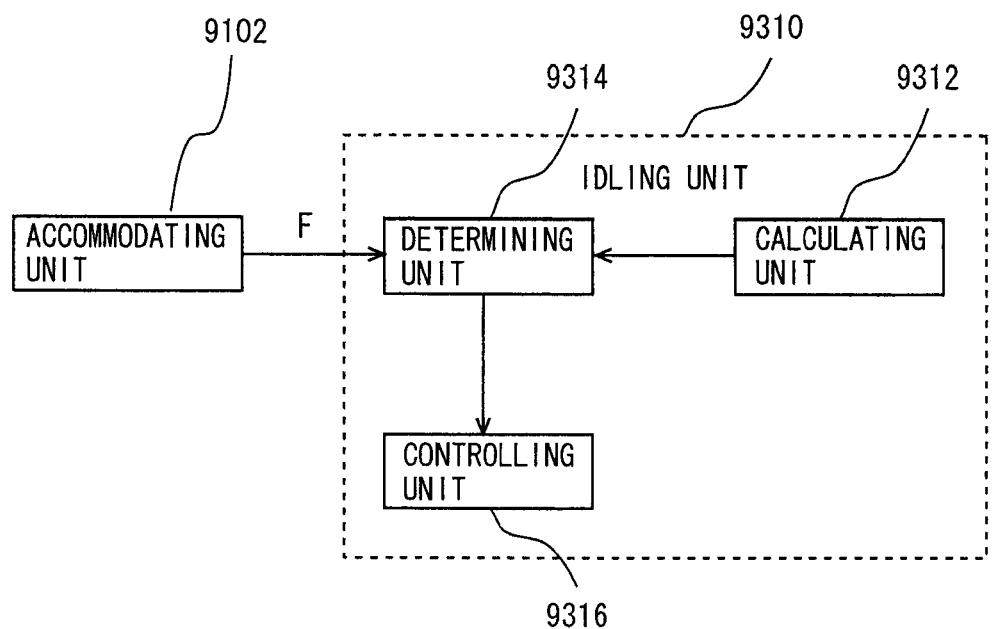
FIG. 18 is a diagram showing an idling unit.

As shown in FIG. 18, idling unit 9310 includes a calculating unit 9312, a determining unit 9314 and a controlling unit 9316. Calculating unit 9312 calculates a second idle determination value which is a dynamic threshold value, in accordance with a first idle determination value which is a static threshold value for defining the target drive force indicating that engine 1000 is in the idle state. The static first idle determination value is predetermined by a developer based on results of an experiment, a simulation, and the like.

Figure 19:
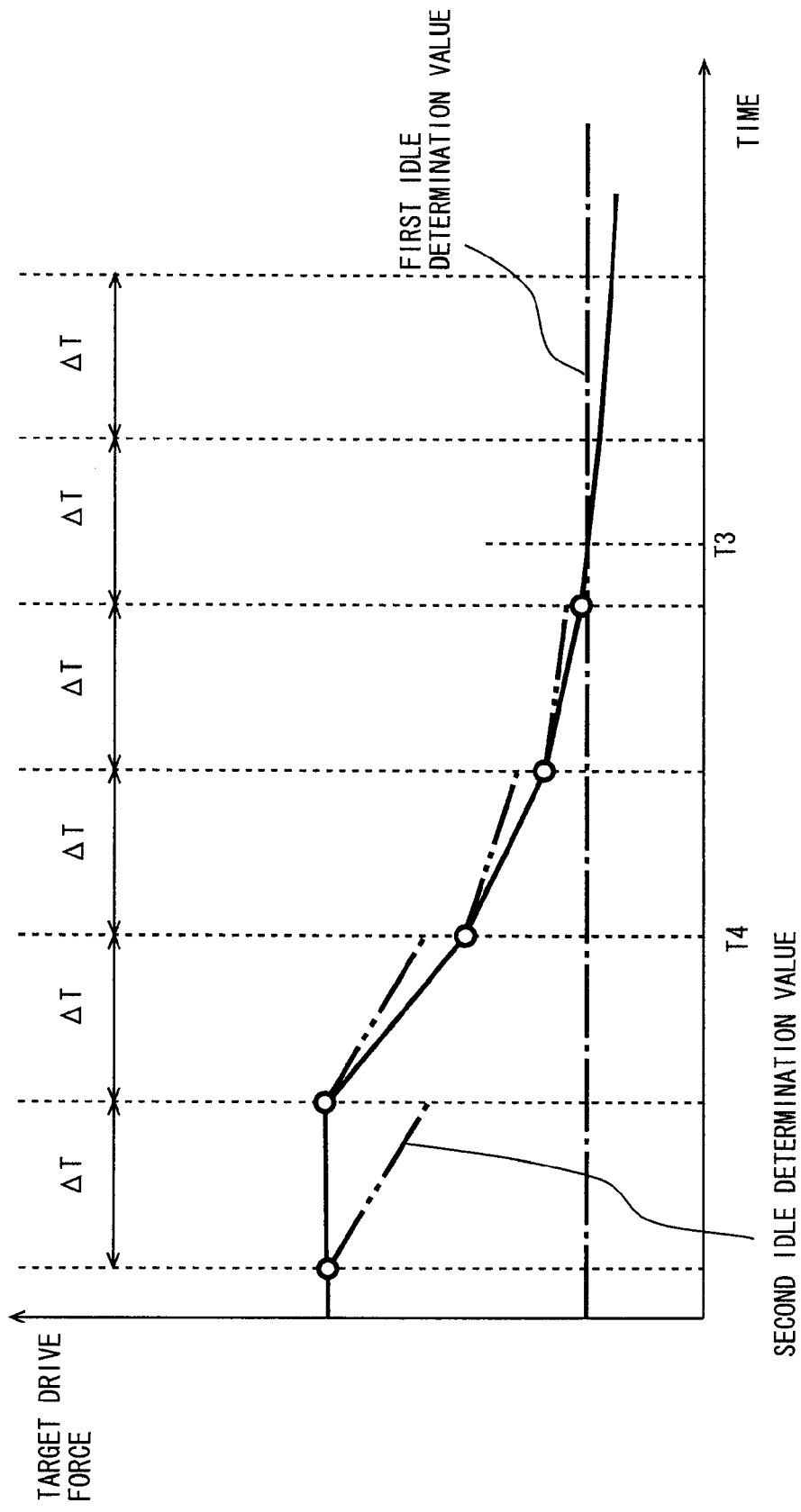
FIG. 19 is a graph showing the target drive force, a static first idle determination value and a dynamic second idle determination value.

For example, a value that changes with a delay with respect to a stepwise change from the dynamic target drive force shown by a solid line in FIG. 19 to the static first idle determination value shown by a chain line is calculated as the dynamic second idle determination value shown by a two-dot chain line.

More specifically, the value that changes with the delay with respect to the stepwise change from a previous value of the dynamic target drive force to the static first idle determination value is calculated as the dynamic second idle determination value. A primary delay response to the stepwise change from the previous value of the dynamic target drive force to the static first idle determination value is calculated as the dynamic second idle determination value. The dynamic second idle determination value is calculated periodically at the same interval as interval $\Delta T$ during which the dynamic target drive force is set.

Comparing the dynamic target drive force and the static first idle determination value, the dynamic target drive force is smaller than the static first idle determination value at time T3. Comparing the dynamic target drive force and the dynamic second idle determination value, the dynamic target drive force is smaller than the dynamic second idle determination value at time T4 that is earlier than time T3. Therefore, determination that engine 1000 is in the idle state can be made earlier by comparing the dynamic target drive force with the dynamic second idle determination value instead of the static first idle determination value.

The dynamic second idle determination value is calculated using engine model C (s) shown in FIG. 11 used in converting unit 9004 of power train driver model 9000. The dynamic second idle determination value may be calculated using engine model C (s) represented by the secondary delay function as shown in FIG. 12.

Returning to FIG. 18, determining unit 9314 determines that engine 1000 is in the idle state when the dynamic target drive force is smaller than the dynamic second idle determination value.

Controlling unit 9316 controls the vehicle in accordance with whether engine 1000 is in the idle state or not. For example, when determining unit 9314 determines that engine 1000 is in the idle state, automatic transmission 2000 is controlled to go into a neutral state. In other words, neutral control is performed. It should be noted that engine 1000 may be controlled such that engine rotation speed NE is set to a predetermined idle rotation speed when determining unit 9314 determines that engine 1000 is in the idle state. In other words, ISC (Idle Speed Control) may be performed.

Returning to FIG. 9, power train manager 9100 sets the dynamic target engine torque finally used for controlling engine 1000, in addition to the dynamic target drive force used for controlling automatic transmission 2000. It should be noted that the target input torque of automatic transmission 2000 may be used instead of the target engine torque.

Power train manager 9100 sets the dynamic target engine torque finally used for controlling engine 1000, based on the dynamic target engine torque inputted from ECT torque controlling system 9140, in addition to the dynamic target drive forces inputted from power train driver model 9000, VDIM system 9110, damping control system 9120, and maximum vehicle speed restricting system 9130.

More specifically, the dynamic target drive force set (selected) by accommodating unit 9102 is converted into the dynamic target engine torque in torque converting unit 9104. An accommodating unit 9106 accommodates the dynamic target engine torque converted from the target drive force in torque converting unit 9104 and the dynamic target engine torque inputted from ECT torque controlling system 9140. As a result, the dynamic target engine torque used for controlling engine 1000 is set. Smaller target engine torque or larger target engine torque of the two target engine torques is selected and outputted to engine controlling system 9200. The target engine torque to be selected from the smaller target engine torque and the larger target engine torque is determined in accordance with an operation state of the vehicle or the like.

The target engine torque is set periodically at the same interval as interval $\Delta T$ during which the dynamic target drive force is set.

Engine controlling system 9200 controls the device provided in engine 1000 for controlling the output torque of engine 1000 such as electronic throttle valve 1030, swirl control valve 1200, ACIS 1300, spark timing, and an EGR (Exhaust Gas Recirculation) valve in order to realize the dynamic target engine torque inputted from power train manager 9100.

In the present embodiment, engine controlling system 9200 includes a calculating unit 9202 and a controlling unit 9204.

Calculating unit 9202 calculates second engine torque which is a dynamic threshold value, from first engine torque which is a static threshold value for determining whether to open or close ACIS valve 1302. The first engine torque is predetermined by a developer based on results of an experiment, a simulation and the like.

For example, a value that changes with a delay with respect to a stepwise change from the dynamic target engine torque to the static first engine torque is calculated as the dynamic second engine torque.

More specifically, the value that changes with the delay with respect to the stepwise change from a previous value of the dynamic target engine torque to the static first engine torque is calculated as the second engine torque. A primary delay response to the stepwise change from the previous value of the dynamic target engine torque to the static first engine torque is calculated as the second engine torque. The second engine torque is calculated periodically at the same interval as interval ΔT during which the dynamic target drive force is set, that is, the dynamic target engine torque.

The dynamic second engine torque is calculated using engine model C (s) shown in FIG. 11 used in converting unit 9004 of power train driver model 9000. The dynamic second torque may be calculated using engine model C (s) represented by the secondary delay function as shown in FIG. 12.

Controlling unit 9204 controls engine 1000 in accordance with a result of comparison between the dynamic target engine torque and the dynamic second engine torque.

More specifically, ACIS valve 1302 is controlled in accordance with a result of comparison between a current value of the dynamic target engine torque and the dynamic second engine torque.

ACIS valve 1302 is controlled to change the length of intake pipe 1032 in accordance with whether the current value of the dynamic target engine torque is larger or smaller than the second engine torque. For example, control is performed to open ACIS valve 1302 when the current value of the dynamic target engine torque is larger than the second engine torque, and to close ACIS valve 1302 when the current value of the dynamic target engine torque is smaller than the second engine torque. It should be noted that control may be performed to close ACIS valve 1302 when the current value of the dynamic target engine torque is larger than the second engine torque, and to open ACIS valve 1302 when the current value of the dynamic target engine torque is smaller than the second engine torque.

Instead of or in addition to ACIS valve 1302, swirl control valve 1200 may be controlled in accordance with a result of comparison between the current value of the dynamic target engine torque and the dynamic second engine torque. Devices controlled in accordance with a result of comparison between the current value of the dynamic target engine torque and the dynamic second engine torque is not limited thereto.

VDIM system 9110 is a system for integrating VSC (Vehicle Stability Control), TRC (TRaction Control), ABS (Anti lock Brake System), EPS (Electric Power Steering), and the like. VDIM system 9110 calculates a difference between a traveling image of the driver with regard to an amount of operation of an accelerator, steering and a brake and a vehicle behavior with regard to various sensor information, and controls the drive force of the vehicle, braking oil pressure, or the like so as to reduce the difference.

The VSC is control of automatically setting an optimal value of the braking oil pressure of wheels, the dynamic target drive force of the vehicle, or the like so as to ensure stability of the vehicle in the case where a sensor detects a state in which front and rear wheels are likely to skid.

The TRC is control of automatically setting an optimal value of the braking oil pressure of the wheels, the dynamic target drive force of the vehicle, or the like so as to ensure optimal drive force when a sensor senses idling of drive wheels at the time of starting and accelerating the vehicle on a slippery road surface.

The ABS is a control system of automatically setting an optimal value of the braking oil pressure so as to prevent locking of the wheels. The EPS is a control system of assisting steering of a steering wheel by force of an electric motor.

The dynamic target drive force set in VDIM system 9110 is inputted to accommodating unit 9102 of power train manager 9100.

Damping control system 9120 sets the dynamic target drive force for decreasing pitching and bouncing of the vehicle calculated using a vehicle model from actual drive force of the vehicle or the like. A conventional technique may be used for a method of setting the drive force for decreasing the pitching and bouncing of the vehicle. Therefore, a further detailed description will not be repeated here.

Maximum vehicle speed restricting system 9130 sets the static target drive force for restricting the vehicle speed to be a predetermined maximum vehicle speed or lower, for example, in accordance with a current acceleration and a vehicle speed. The static target drive force set by maximum vehicle speed restricting system 9130 is converted into the dynamic target drive force in a converting unit 9132.

ECT torque controlling system 9140 sets the static target engine torque demanded of engine 1000 at the time of shifting gears of automatic transmission 2000. The static target engine torque set by ECT torque controlling system 9140 is set so as to realize torque-down or torque-up for reducing, for example, shift shock.

The static target engine torque set by ECT torque controlling system 9140 is converted into the dynamic target engine torque by a converting unit 9142.

As mentioned above, according to the present embodiment, the dynamic threshold value when the engine, the automatic transmission and the like are in the transition state is calculated in accordance with the static threshold value determined based on the state where the engine, the automatic transmission and the like are stabilized. The engine and the automatic transmission are controlled in accordance with a result of comparison between the target drive force or the target engine torque and the dynamic threshold value. As a result, in the transition state of the engine, the automatic transmission and the like, it can be determined whether the engine is in the idle state or not and whether or not to shift gears of the automatic transmission, without presetting the threshold value when the engine, the automatic transmission and the like are in the transition state. Thus, determination about control can be made before the driving source, the automatic transmission and the like are stabilized. Consequently, the response property of the control can be improved.

It should be noted that target acceleration (a target value of acceleration) of the vehicle may be used instead of the target drive force and the target engine torque. In this case, engine controlling system 9200 may control engine 1000 such that the acceleration of the vehicle attains the set target acceleration. In other words, engine controlling system 9200 may control engine 1000 to realize the target drive force calculated by multiplying the target acceleration by the vehicle weight. Since the drive force of the vehicle is changed in accordance with the target acceleration, the target acceleration is a target value for the drive force of the vehicle.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

The invention claimed is:

1. A control apparatus for a vehicle equipped with a driving source, and an automatic transmission, comprising:
   a setting unit that sets a dynamic target value for drive force of said vehicle;
   a calculating unit that calculates a dynamic second threshold value in accordance with a static first threshold value; and
   a controlling unit that controls said vehicle in accordance with a result of comparison between said target value and said second threshold value,
   wherein the static first threshold value indicates a threshold value determined based on a state where the drive force of the vehicle is stabilized, and
   wherein the dynamic second threshold value indicates a threshold value for a transition state where the drive force of a vehicle changes,
   said calculating unit calculates, as said second threshold value, a value that changes with a delay with respect to a stepwise change from said target value to said first threshold value,
   said setting unit sets said target value repeatedly,
   said calculating unit calculates, as said second threshold value, the value that changes with the delay with respect to the stepwise change from a previous value of said target value to said first threshold value, and
   said controlling unit controls said vehicle in accordance with a result of comparison between a current value of said target value and said second threshold value.

2. The control apparatus for a vehicle according to claim 1, wherein
   said calculating unit calculates, as said second threshold value, a primary delay response to the stepwise change from the previous value of said target value to the first threshold value.

3. The control apparatus for a vehicle according to claim 1, wherein
   said controlling unit controls said automatic transmission such that gears are shifted in accordance with whether said target value is larger or smaller than said second threshold value.

4. The control apparatus for a vehicle according to claim 1, wherein
   said driving source is an engine,
   said control apparatus further comprises a determining unit that determines that said engine is in an idle state when said target value is smaller than said second threshold value, and
   said controlling unit controls said vehicle in accordance with whether said engine is in the idle state or not.

5. The control apparatus for a vehicle according to claim 1, wherein
   said driving source is an engine capable of changing a length of an intake pipe, and
   said controlling unit controls said engine such that the length of said intake pipe is changed in accordance with whether said target value is larger or smaller than said second threshold value.

6. The control apparatus for a vehicle according to claim 1, wherein
   said target value is a target value of output torque of said driving source.

7. The control apparatus for a vehicle according to claim 1, wherein
   said target value is a target value of input torque of said automatic transmission.

8. The control apparatus for a vehicle according to claim 1, wherein
   said target value is a target value of the drive force of said vehicle.

9. The control apparatus for a vehicle according to claim 1, wherein
   said target value is a target value of acceleration of said vehicle.

10. A control method for a vehicle equipped with a driving source and an automatic transmission, comprising the steps of:
    setting a dynamic target value for drive force of said vehicle;
    calculating a dynamic second threshold value in accordance with a static first threshold value; and
    controlling said vehicle in accordance with a result of comparison between said target value and said second threshold value, wherein
    said step of calculating calculates, as said second threshold value, a value that changes with a delay with respect to a stepwise change from said target value to said first threshold value,
    said step of setting sets said target value repeatedly,
    said step of calculating calculates, as said second threshold value, the value that changes with the delay with respect to the stepwise change from a previous value of said target value to said first threshold value, and
    said step of controlling controls said vehicle in accordance with a result of comparison between a current value of said target value and said second threshold value.

* * * * *